United States Patent

Barstow

[15] 3,664,194
[45] May 23, 1972

[54] VALVE ASSEMBLY FOR INJECTING A LIQUID SAMPLE INTO AN ANALYZING INSTRUMENT

[72] Inventor: Ormond E. Barstow, Midland, Mich.
[73] Assignee: The Dow Chemical Company, Midland, Mich.
[22] Filed: Sept. 29, 1970
[21] Appl. No.: 76,556

[52] U.S. Cl. .................................................. 73/422 GC
[51] Int. Cl. ............................................... G01n 1/10
[58] Field of Search ................................. 73/422 GC

[56] References Cited

UNITED STATES PATENTS

| | | | |
|---|---|---|---|
| 2,846,121 | 8/1958 | Ronnebeck | 73/422 GC |
| 3,114,393 | 12/1963 | Vlasic | 73/422 GC |
| 3,550,453 | 3/1969 | Lighther | 73/422 GC |
| 3,479,880 | 11/1969 | Mutter et al | 73/422 GC |

Primary Examiner—S. Clement Swisher
Attorney—Griswold & Burdick, V. Dean Clausen and William R. Norris

[57] ABSTRACT

A valve assembly is provided which comprises basically a stationary base and a slidable body member, the unit being attached to an analyzing instrument. The base includes a passageway for conducting a liquid stream to be analyzed, such as water, into the valve assembly. The slidable member includes a plunger or piston slidably carried in a chamber and an orifice which communicates with the chamber. At one point during sliding contact of the body member with the stationary base, the orifice is aligned with the passageway. At a later point the orifice lines up with a discharge port in the base which communicates with the analyzing instrument. As the orifice lines up with the passage the plunger is actuated to withdraw a precise amount of liquid sample into the chamber through the orifice. When the orifice lines up with the discharge port the plunger is again actuated to "shoot" the sample downwardly through the orifice and into the analyzing instrument.

5 Claims, 6 Drawing Figures

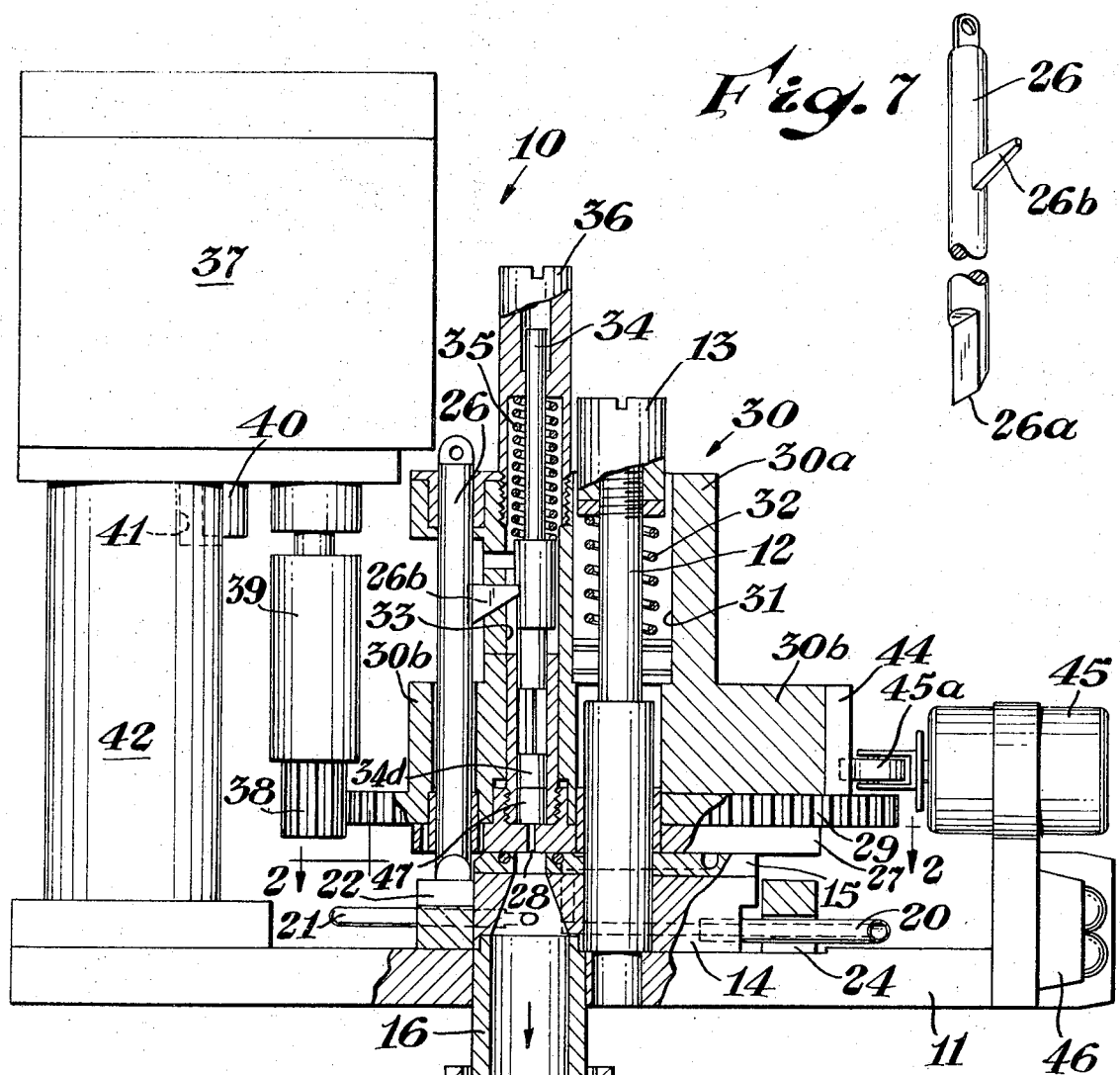
Fig. 7
Fig. 1
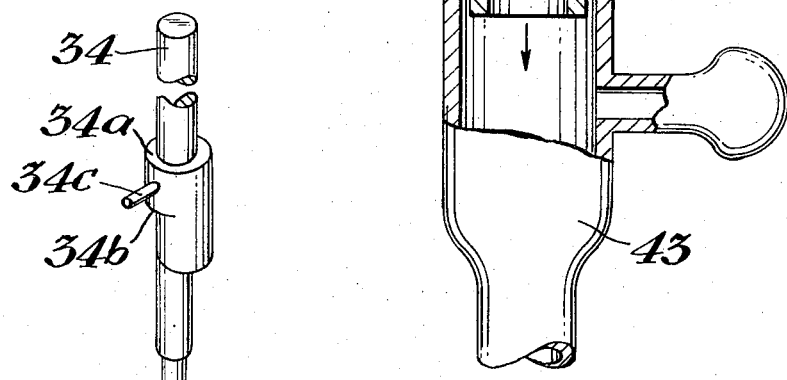
Fig. 6
INVENTOR.
Ormond E. Barstow
BY J. Dean Clausen
AGENT INVENTOR.
Ormond E. Barstow
BY V. Dean Clausen
AGENT

VALVE ASSEMBLY FOR INJECTING A LIQUID SAMPLE INTO AN ANALYZING INSTRUMENT

BACKGROUND OF THE INVENTION

This invention relates to injection of a liquid sample into an analyzing instrument. More specifically, the invention concerns a valve assembly capable of withdrawing a precise amount of liquid sample from a stream and "positively" discharging the sample into the analyzing instrument.

In the field of pollution control, one criterion for determining the quality of water is the amount of oxygen required by oxidizable constituents of the water. One way of determining the oxygen demand of water is by analyzing a sample of the water in an instrument known as a total oxygen demand analyzer (TOD).

Various types of valves have been used to inject a water sample into an analyzing instrument, such as a TOD. One commercially available valve commonly used for this purpose has a sample injection mechanism consisting basically of a slider block positioned between opposing horizontal stationary blocks. Holes are provided in the slider block and the stationary block which function as a sample port and carrier gas port. The slider block is moved horizontally back and forth between the stationary blocks by an air-actuated diaphragm. During this sliding contact the liquid sample is picked up and forced, by a carrier gas, down into the analyzing instrument through a fixed capillary tube attached to the lower stationary block.

The valve described above has several disadvantages. A particularly undesirable feature is that injection of the liquid sample into the combustion tube of the analyzer must depend on a combination of gravity and carrier gas flow to force the sample down through the capillary. In this procedure, a portion of the liquid sample will cling to the walls of the capillary, resulting in a significant variation in the data recorded by the analyzer from one sample to the next. Another disadvantage is that the sample discharge end of the capillary projects down into the combustion tube, so that most of the lower end of the capillary is exposed to the high heat of the combustion zone. This causes a portion of the sample to dry on the capillary walls before the liquid can drop into the combustion tube. The obvious result is a further variation in the analytical data obtained from one sample to the next.

SUMMARY OF THE INVENTION

A principal object of the invention is to provide a simple, compact device for injecting a liquid sample into an analyzing instrument.

A more specific object is to provide a valve assembly for injecting a liquid sample into an analyzing instrument by "positive" displacement of the sample from the valve assembly into the instrument.

Another object is to provide a valve assembly of the type described in which pick up of the liquid sample and injection of the sample into the analyzing instrument is done in a closed system.

Broadly the apparatus and method of the invention is directed to injecting a liquid sample into an analyzing instrument. Injection of the sample is accomplished with a valve assembly which consists primarily of a stationary base and a slidable body member. The stationary base includes a passageway for conducting the liquid into the valve assembly and for carrying liquid not injected into the instrument away from the assembly. The liquid sample is carried into the analyzing instrument through a discharge port in the stationary base which communicates with the instrument. One surface of the slidable body is adapted to mate with the passageway surface of the base member and to maintain sealing contact with the passageway during sliding contact of the body with the base. A plunger means is slidably carried in a chamber in the body. The body member also includes an opening which communicates the chamber and a means for actuating the plunger. During sliding contact of the base with the body member the opening is aligned with the liquid conducting passageway for a given period. During this period the plunger is actuated to withdraw the sample into the chamber through said opening. At a later point during the sliding contact, the opening lines up with the discharge port. At this point the plunger is actuated again to push the sample forcibly from the chamber, through the opening and the discharge port, and into the analyzing instrument.

BRIEF DESCRIPTION OF THE DRAWINGS

FIG. 1 is a side elevation view, mostly in section, of a liquid sample injection valve according to one embodiment of the invention.

FIG. 6 is a perspective view of a piston component of the present valve.

FIG. 7 is a perspective view of a piston lift pin component of the present valve.

DESCRIPTION OF A PREFERRED EMBODIMENT

Figures 2, 4:
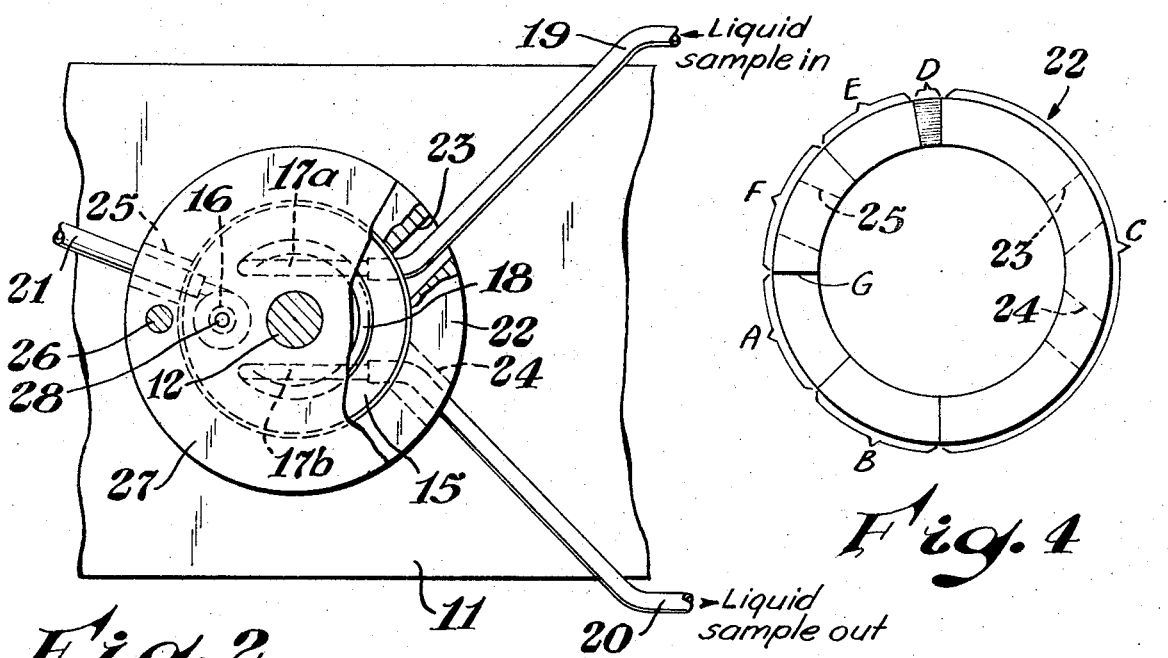
FIG. 2 is a fragmentary top plan view, partly in section, taken along line 2—2 of FIG. 1, which illustrates a portion of the sample injection mechanism of the present valve.
FIG. 4 is a top plan view of an annular cam component of the present valve.

In the drawing, which comprises FIGS. 1–7, is illustrated a preferred embodiment of the present valve assembly invention. Referring particularly to FIG. 1, the valve assembly is indicated generally by reference numeral 10. Valve 10 includes a base plate 11, to which is attached an upstanding stud 12. Stud 12 is threaded at its upper end to receive a nut 13. A disc member 14, which is a two-piece construction with a central opening therein, fits down over stud 12. The bottom of the disc, which is preferably metal, seats against the top surface of base plate 11. The top of the disc comprises a pad 15, preferably a plastic material, which is adhesively bonded to the metal bottom portion.

A hollow tubular member 16, which functions as the sample discharge tube, is fitted into one side of disc 14 adjacent to stud 12. Discharge tube 16 is vertically disposed in an opening in base plate 11, so that the lower end of the tube extends below the bottom surface of the base plate. The upper end of tube 16 forms a generally cone-shaped neck, which terminates flush with the top surface of pad 15. Referring particularly to FIGS. 1 and 2, disc 14 also includes fluid-conducting passageways 17, 18. Passageway 17 comprises a right-hand branch 17a and a left-hand branch 17b, which are closed passageways disposed generally horizontally in the lower metal portion of the disc 14. Passageway 18 is disposed generally horizontally along the top surface of pad 15. In the embodiment shown herein, passageway 18 is a crescent-shaped channel which describes an arc of about 270°.

Inside disc 14 the right-hand branch passageway 17a runs horizontally to a point directly beneath the right-hand end of passageway 18. At this point the passageway turns vertically upward to intersect with passageway 18. Similarly, left-hand branch passageway 17b vertically upward from a horizontal course to communicate with the left-hand end of passageway 18. The outer end of passageway 17a into a fluid inlet line 19, which is preferably stainless steel tubing. Similarly, the outer end of passageway 17b connects into a fluid outlet line 20. The fluid passageways described above are for conducting a liquid stream through valve assembly 10, as explained in more detail hereinafter. Another fluid-conducting passageway 21 connects into the cone-shaped neck of discharge tube 16. Fluid line 21, preferably steel tubing, is for directing purge gas into the discharge tube.

A cam 22 encircles disc member 14, with the bottom surface of the cam being seated against the top surface of base plate 11. Preferably, the cam 22 is an annular cam. Slots 23 and 24 in cam 22 provide openings for inlet line 19 and outlet line 20 to pass through the cam. Slot 25, on the opposite side of the cam from slots 23 and 24, provides an opening for purge gas line 21. The top surface of cam 22 is adapted for engaging and actuating a lift pin 26. Actuation of the lift pin involves an up and down movement of the pin in conformance with the configuration of the cam top surface. To further explain, the lower end of lift pin 26 is a chisel-shaped edge 26a (note FIG. 7). The lift pin edge 26a rides continuously along the top surface of cam 22 during rotation of valve 10, as explained in more detail hereinafter. Lift pin 26 thus rises and falls according to the uneven configuration of the top surface of cam 22.

Figure 5:
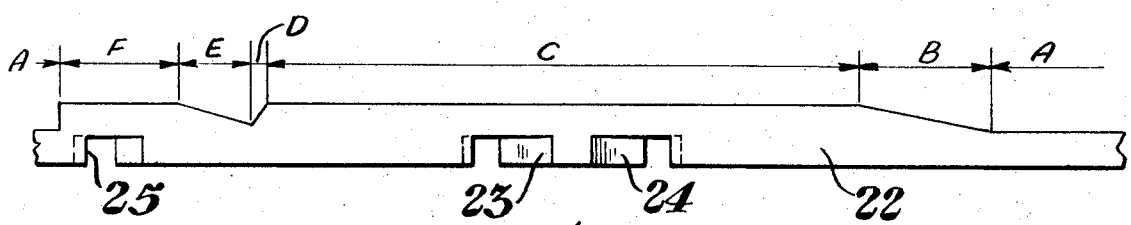
FIG. 5 is a development or lay-out view of the cam shown in FIG. 4.

Referring particularly to FIGS. 4 and 5, the top surface of cam 22 comprises several distinct sectors of varying configuration, which determine the rise and fall of lift pin 26. Sector A, which comprises a flat surface having an arc of about 45°, is designated as a travel sector. Sector B is a purge sample pickup sector, a surface which slopes upwardly at an angle of about 10° and describes an arc of about 45°. Sector C is a purge sample hold sector, a flat surface defining an arc of about 180°. Sector D is a purge sample discharge sector, a downwardly sloping surface with an arc of about 10°. Sector E is a test sample pick-up sector, a surface which slopes upwardly at an angle of about 11° and which defines an arc of about 35°. Sector F is a test sample hold sector, a flat surface defining an arc of about 45°. At the end of flat sector F, the cam surface drops off perpendicularly to join with flat sector A. The perpendicular surface, designated as point G, is the test sample discharge point.

A plate 27, referred to as an orifice plate, is rotatably carried on stud 12. The plate 22 is preferably an annular plate. The bottom surface of plate 27 seats flush against the top surface of disc 14 at all times during rotation of the plate. A small orifice 28 is drilled through plate 27 and is offset from the center of the plate. In the present embodiment the orifice is preferably circular, with a diameter of about 0.010 inches. For a given period during rotation of plate 27 on stud 12, orifice 28 is in vertical alignment with passageway 18 in pad 15, i.e. the orifice is centered directly over passageway 18. At a further point in the rotation of plate 27, orifice 28 is in vertical alignment with the upper end of discharge tube 16. More specifically, the orifice is centered over the coneshaped neck of the tube. Also, at this point, orifice 18 is contiguous with the neck of tube 16, so that a liquidtight seal is formed between the orifice and the tube neck. Adjacent to orifice 28 in plate 27 is a second opening, which serves as a guide hole for the lower end of lift pin 26. Attached to plate 27 is a gear 29, preferably an annular gear. Gear 29 is rotatably carried on stud 12, with the bottom surface of the gear being seated against the top surface of plate 27.

A valve body, indicated generally by reference numeral 30, is rotatably carried on stud 12. A central opening 31 allows the valve body to fit down over stud 12. Basically, valve body 30 is a solid block comprising an upper portion 30a, of a rectangular shape, and a lower portion 30b, which is circular. Valve body 30 is held in place on stud 12 by spring 32, which fits over the stud and is compressed by nut 13 which threads onto the stud. To provide for valve body 30 to swivel (rotate) about stud 12, the base of spring 32 seats against a bearing member comprising a flat washer, a thrust bearing underneath the washer, and a second flat washer under the bearing. The bottom flat washer seats on a shoulder in the central opening of valve body 30 (note FIG. 1.

Adjacent to opening 31 in valve body 30 is a smaller opening 33, which is in vertical alignment with orifice 28 and plate 27. Opening 33 defines a chamber for slidably receiving a piston 34. To provide for up and down movement of piston 34 in chamber 33, the piston is held under tension by spring 35. Spring 35 fits over the upper shank of piston 34 and is compressed between upper shoulder 34a on the piston shank and the inner shoulder of nut 36, which threads into opening 33. Referring to FIGS. 1, 6 and 7, it will be noted that arm 26b on lift pin 26 is in continuous engagement with a lower shoulder 34b on piston 34. As edge 26a of pin 26 rides the top surface of cam 22, therefore, the pin moves piston 34 up and down in conformance with the configuration of the various sectors of the cam top surface.

Piston 34 includes a horizontal pin 34c (above shoulder 34b) which rides up and down in a guide slot (not shown) in valve body 30. This keeps piston 34 from rotating freely in chamber 33 and thus prevents arm 26b on lift pin 26 from slipping off of shoulder 34b. The lower (plunger) end of piston 34 comprises an enlarged tip 34d, which has a snug sliding fit in chamber 33. At the lowest point in the downward stroke of piston 34, the bottom of the tip 34d seats flush against the bottom of chamber 33, so that the piston tip "seals off" the top of orifice 28.

As indicated in FIG. 1, lift pin 26 is slideably carried in a split opening in valve body 30. The upper part of the opening is positioned in an overhanging ledge in rectangular portion 30a of the valve body. The lower part of the opening is in the circular portion 30b of valve body 30. Both the upper and lower part of the split opening are in direct vertical alignment with the top surface of cam 22, to allow lift pin 26 to center on the cam top surface. A drive means for simultaneously rotating gear 29, orifice plate 27 and valve body is provided by a motor 37, which is mounted on base plate 11 adjacent to gear 29. Power from motor 37 to gear 29 is transmitted by pinion 38, which is mounted on shaft 39 and which meshes with gear 29.

To prevent pinion 38 from disengaging with gear 29 during operation of motor 37, a pin 40 at the base of the motor "locks" into a slot 41 on motor mount 42. To achieve continuous rotation of the gear, orifice plate and valve body, motor 37 is preferably a constant speed, low rpm, electric motor. The invention is not limited to an electric drive means however. Any drive unit which will provide continuous rotation at a given speed, as determined by the frequency of the sampling desired, may be used.

Figure 3:
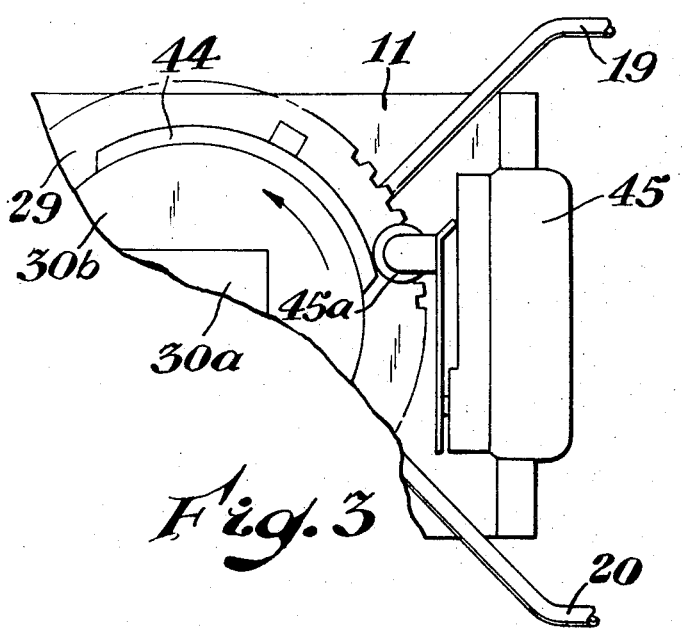
FIG. 3 is a fragmentary top plan view, partly schematic, illustrating an electric switch and a ramp means for actuating the switch, as components of the present valve.

In the use of valve assembly 10 on an analyzing instrument, for example, a TOD analyzer, (not shown), the unit is mounted adjacent to the combustion zone of the analyzer. A bracket (not shown), which is attached to the underside of base plate 11, clamps onto a support member on the instrument itself. The lower end of sample discharge tube 16 fits into the open upper end of the combustion tube 43. The lower end of the combustion tube extends into the combustion zone of the analyzing instrument. Referring particularly to FIGS. 1 and 3, a ramp member 44 comprises an elongated, arcuate piece having inwardly beveled ends. Ramp 44 is mounted immediately above gear 29 along one side of lower part 30b of valve body 30. The ramp is attached to the valve body by a cap screw or other suitable fastening means. Mounted on base plate 11 immediately adjacent to ramp 44 is a microswitch 45, which includes a contact roller 45a mounted on a breaker arm. Switch 45 is connected into a terminal plate 46 which, in turn, connects into a recording device (not shown) in the analyzer.

A typical application of the present valve is in the injection of a water sample into a TOD analyzer. Such an application is described herein to illustrate the practice of the invention. In the operation of the valve assembly, the body of water to be analyzed is directed in a continuous stream into inlet line 19. From line 19 the stream flows through branch passageway 17a and upwardly into crescent-shaped channel 18. Entering the right-hand end of channel 18, the stream flows in a clockwise direction around to the left-hand end of the channel. At this point the stream drops down into branch passageway 17b and on into outlet line 20, which carries the water not injected into the instrument away from the valve body.

In describing a typical sample injection cycle, assume that lower edge 26a of lift pin 26 is in contact with the top surface of cam 22 in sector A just beyond point G. Motor 37 is started to rotate gear 29, orifice plate 27, and valve body 30 in a counterclockwise direction. As valve body 30 rotates, lift pin 26 follows the top surface of cam 22. In the travel of lift pin 26 on the flat surface of cam sector A, the bottom of piston tip 34d is seated against the bottom of chamber 33. When lift pin 26 reaches sector B, orifice 28 is centered directly over channel 18. As lift pin 26 rides upwardly on the sloping surface of sector B it pushes piston 34 to the top of its upward stroke. As the piston is pushed upwardly, it leaves an empty space 47 in chamber 33 between the bottom of piston tip 34d and the top of orifice 28 (note FIG. 1). The upward stroke of piston 34 creates an aspirating action in space 47, which draws a microliter sample of water out of channel 18 and upwardly into space 47 through orifice 28.

The first sample drawn into space 47 of piston chamber 33 is a purge sample, which is held in the chamber while lift pin 26 rides the flat surface of cam sector C. When lift pin 26 reaches cam sector D, it rides downwardly at a steep angle, allowing piston 34 to drop rapidly. When the piston drops, tip 34d seats against the bottom of chamber 33, which forces the purge sample down through orifice 28 and back into channel 18. At the bottom of sector D, the lift pin 26 rides immediately upwardly again on cam sector E. This pushes piston 34 upwardly again so that a fresh (test) sample is drawn into space 47 in piston chamber 33. The test sample is held in chamber 33 while lift pin 26 rides the flat surface of cam sector F.

At the end of sector F, lift pin 26 reaches point G of the cam sector. At point G, which is a perpendicular surface, lift pin 26 drops abruptly down, with a snapping action, to the flat surface of cam sector A. At the precise moment that lift pin 26 reaches point G, orifice 28 in plate 27 is centered directly over the neck of discharge tube 16. When lift pin 26 drops over point G, therefore, the bottom of piston tip 34d hits against the bottom of chamber 33 with considerable force. This is caused by decompression of spring 35 which pushes the piston abruptly downwardly. The downward plunge of the piston pushes the test sample through orifice 28 with enough force to "shoot" the sample straight down into combustion tube 43 without touching the walls of discharge tube 16, as indicated by the arrows in FIG. 1.

After discharge of the test sample into the combustion tube, the cycle of purge sample pick-up and discharge, followed by pick-up and discharge of the test sample, may be repeated an indefinite number of times, since the sample injection mechanism is continuously rotated. Throughout the sample injection operation, a purge gas, such as nitrogen, is continuously directed through line 21 into the neck of discharge tube 16.

For most of the sample injection cycle, roller 45a rides against the circular periphery of valve body part 30b. However, at a predetermined point in the cycle, i.e. while the purge sample is being held in chamber 33, roller 45a rides up onto ramp 44 at the left-hand end of the ramp, as viewed in FIG. 3. The roller remains in contact with the ramp until just prior to discharge of the test sample into combustion tube 43, at which time the roller drops off the right-hand end of the ramp. During the time the roller is in contact with ramp 44, an electrical circuit from microswitch 45 to the recording device in the analyzer is broken. Breaking of this circuit "zeros" the recorder base line. Setting of the recorder base line to a zero position co-ordinates injection of the sample into the analyzer with recording of the analytical data from the sample.

In the valve assembly embodiment described herein, as explained above, the stream of water to be analyzed is directed into channel 18, so that it flows in a clockwise direction. At the same time the orifice plate 27 is rotated above the stream of water in a counterclockwise direction. By this arrangement, therefore, when the purge sample is discharged back into channel 18, it will flow in the opposite direction from the travel of orifice 28 in plate 27. As plate 27 continues to rotate, therefore, the next sample picked up by orifice 28 is a fresh, uncontaminated sample, which is discharged into the analyzer as the sample to be tested. It will be understood that the present valve invention is not limited to the sample injection procedure described above. In an alternative embodiment, for example, the sample stream could be directed into the valve body so that it flows through channel 18 in a counterclockwise direction. In this instances, the orifice plate 27 would be adapted to rotate in a clockwise direction.

It will also be appreciated that various other modifications in the construction and operation of the present valve assembly, are within the scope of the invention. For example, some of the modifications include the following:

1. The sliding contact between the stationary base member and the slidable body member can be on a plane which is horizontal, vertical, oblique, or the like.

2. The shape of the mated sliding contact surfaces of the respective base member and sliding body can be flat, conical, cylindrical, spherical, or the like.

3. Relative motion of the slidable body to the stationary base can be rotary, linear, oscillatory, or the like; including continuous or intermittent motion, either unidirectional or multi-directional.

4. The valve assembly can be operated manually, semi-automatically or automatically.

5. Actuation of the plunger means can be accomplished by electrical means (e.g. a solenoid), an air cylinder, hydraulic means, and the like.

6. Various types of prime movers may be used for the drive means, such as an electric motor, an air cylinder, hydraulic means, or the like.

What is claimed is:

1. In a valve assembly for injecting a liquid sample into an analyzing instrument, the combination which includes:
   A. a stationary base member which:
      has a passageway on one surface thereof for conducting the liquid to be analyzed into said valve assembly and for discharging the liquid not injected into the analyzing instrument from said valve assembly,
      has a port means in communication with the analyzing instrument for carrying the liquid sample into the said instrument,
   B. a slidable body member which:
      has a surface which mates with the passageway surface of the base member and which surface maintains sealing contact with said passageway during sliding contact of the body member with the base member,
      has a plunger means slidably carried in a chamber in the body member and an opening in communication with said chamber, wherein
      the said opening is in alignment with the liquid-conducting passageway for a given period during sliding contact of the body member with the base member,
      the said opening is in alignment with the said port at a given point during sliding contact of the body member with the base member,
      the said opening is adapted to contain a given amount of liquid sample withdrawn from the passageway into the chamber during sliding contact of the body member with the base member, and
      wherein the slidable body member has means for slidably actuating the plunger in the chamber to withdraw the liquid sample from the passageway and to positively discharge the sample from the chamber through the opening and the port means into the analyzing instrument.

2. In a valve assembly for injecting a liquid sample into an analyzing instrument, the combination which includes:
   A. a base member which:
      has an upstanding stud member thereon,
      has an opening therethrough adjacent to the stud member;
   B. a disc member which:
      is carried on the stud member, such that the bottom of said disc seats against the top surface of the base member, has a first fluid-conducting passageway disposed generally horizontally in the main body of the disc member, has a second fluid-conducting passageway disposed generally horizontally along the top surface of the disc member and which communicates with the first passageway, includes a tubular member vertically disposed in the opening in the base member, wherein the upper end of the tubular member is flush with the top surface of the disc member;

C. a cam member which:

encircles the disc member and is carried on the base member, has a top surface adapted for engaging and actuating a lift pin member in accordance with the configuration of said top surface;

D. a plate member rotatably carried on the stud member, the bottom surface of the plate being seated flush against the top surface of the disc member during rotation of the plate, the plate having an orifice therein which:

is aligned with the second fluid-conducting passageway for a given period during rotation of the plate, and is aligned with the upper end of the tubular member at a given point during rotation of the plate;

E. a valve body which:

is rotatably carried on the stud member, has a first opening therein in alignment with the opening in the plate, has a second opening therein in alignment with the top surface of the cam member, includes a drive member carried on said valve body;

F. a piston member which:

has a shoulder portion, is slidably carried in the first opening in the valve body;

G. a pin slidably carried in the second opening of the valve body, wherein:

the pin is in continuous engagement with the top surface of the cam, and the pin includes an arm in continuous engagement with the shoulder portion of the piston member;

I. a drive means which engages the drive member on the valve body to thereby simultaneously rotate the drive member, the plate and the valve body.

3. The valve of claim 2 wherein the configuration of the cam member top surface is defined by:

a travel sector which defines a flat surface, a purge sample pick up sector which defines an upwardly sloping surface, a purge sample hold sector which defines a flat surface, a purge sample discharge sector which defines a downwardly sloping surface, a test sample pick up sector which defines a flat surface, a test sample hold sector which is a flat surface, and a test sample discharge point which is a perpendicular surface.

4. In a method of injecting a liquid sample into an analyzing instrument, the improvement comprising the steps of:

A. positioning a sample injection valve assembly adjacent to the analyzing instrument, B. flowing a stream of liquid to be analyzed in a clockwise direction through a passageway disposed in said valve assembly, C. rotating in a counterclockwise direction a plate member positioned in the valve assembly above the passageway, the said plate having an orifice therein which is aligned with said passageway for a given period during rotation of the plate, D. withdrawing a first sample from the liquid during rotation of the plate by pulling the sample upwardly through said orifice into a piston chamber in the valve assembly which communicates with said orifice, E. discharging the first sample back into the stream during rotation of the plate by forcing the sample downwardly through said orifice, F. withdrawing a second sample from the liquid stream during rotation of the plate, and G. discharging the said second sample through the orifice in the plate at a point during rotation of said plate wherein the said orifice is aligned with a tubular member positioned in the valve assembly below said orifice, and H. thereby directing the sample into said tubular member and thence into the analyzing instrument.

5. The method of claim 4 in which:

A. the stream of liquid to be analyzed is flowed through the passageway in the valve assembly in a counterclockwise direction, and B. the plate positioned in the valve assembly above said passageway is rotated in a clockwise direction.

* * * * *